Feb. 13, 1940.  E. G. HAWKINS  2,190,151
METHOD OF DEAERATING FROZEN FOODS
Filed Oct. 24, 1938   2 Sheets-Sheet 1
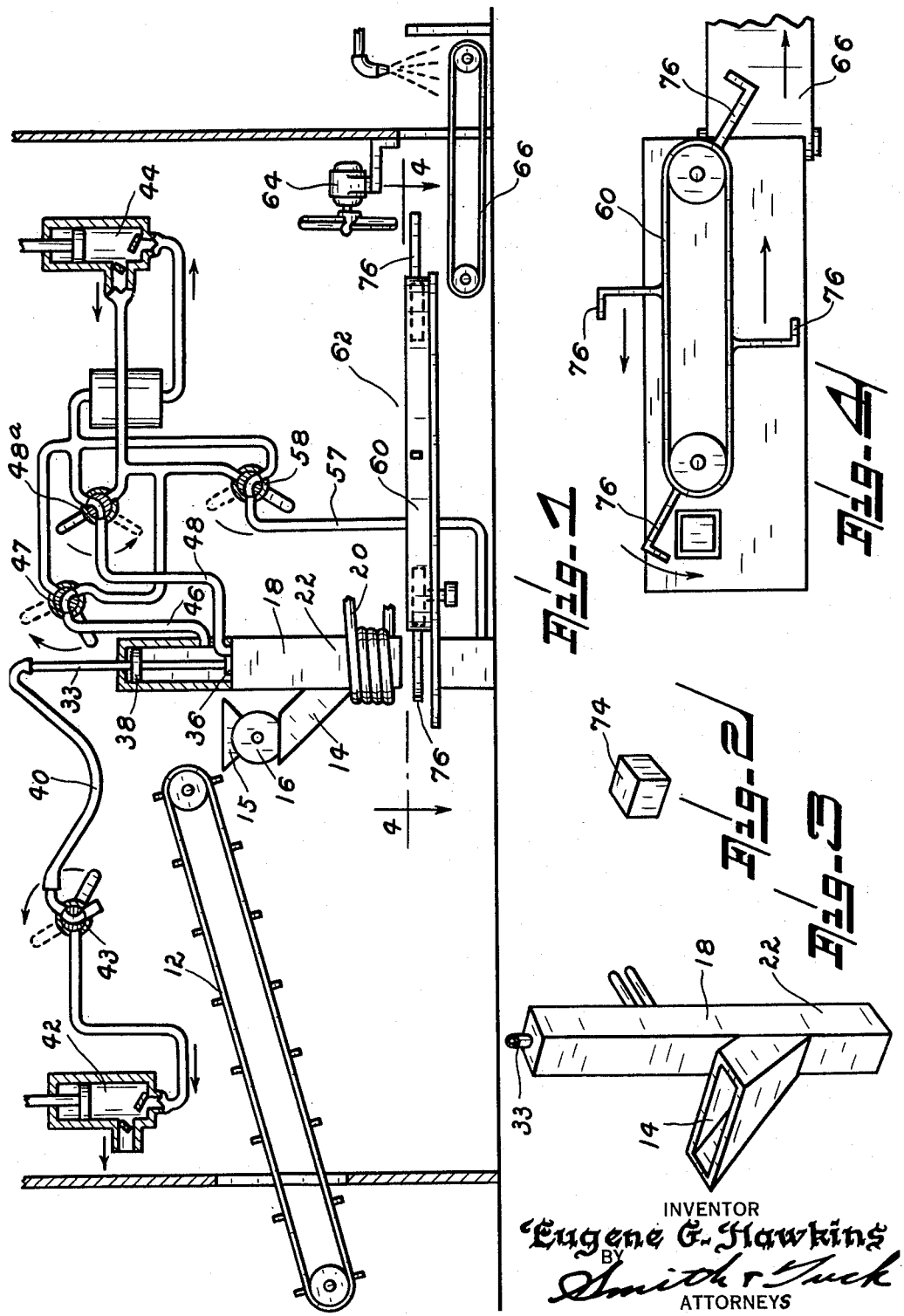
INVENTOR
Eugene G. Hawkins
BY
Smith r Tuck
ATTORNEYS Feb. 13, 1940. E. G. HAWKINS 2,190,151
METHOD OF DEAERATING FROZEN FOODS
Filed Oct. 24, 1938 2 Sheets-Sheet 2
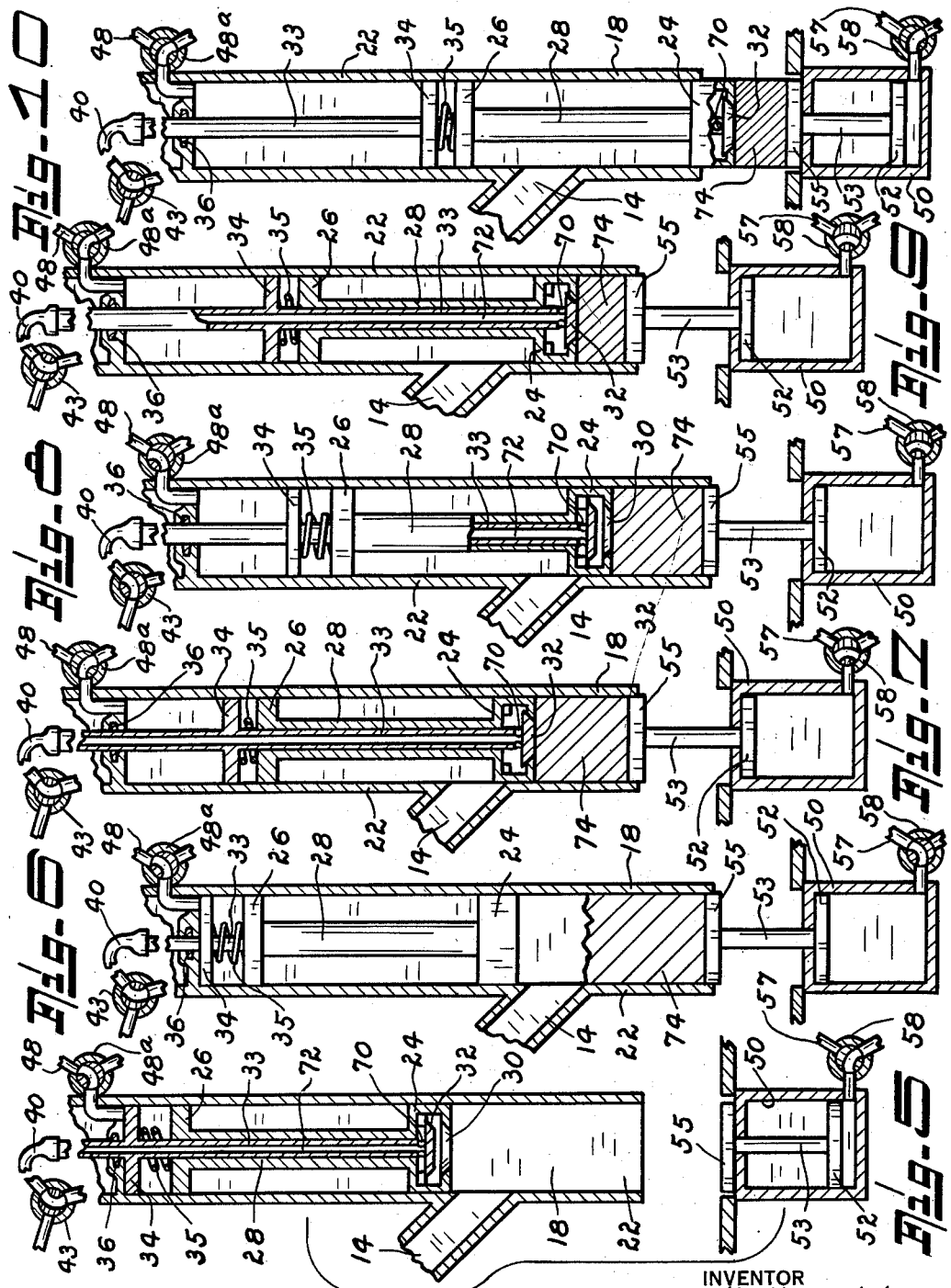
INVENTOR
Eugene G. Hawkins
BY
Smith & Tuck
ATTORNEYS Patented Feb. 13, 1940

2,190,151

UNITED STATES PATENT OFFICE 2,190,151

METHOD OF DEAERATING FROZEN FOODS

Eugene G. Hawkins, Seattle, Wash.

Application October 24, 1938, Serial No. 236,765

4 Claims. (Cl. 99—192)

My present invention relates to the general art of preserving foods by cold storage methods and more particularly to a method of deaerating frozen foods.

In recent years there has been a marked increase in the use of cold storage methods in the preservation of foods. This is particularly true of vegetables, fruit, berries, meats, and the like, that are preserved by the so-called quick-freeze method as distinguished from cold storage where foods are usually kept at only a substantially reduced temperature. There has been a notable improvement in the quality of food preserved by the quick-freeze method and with the general increased home use of refrigerators and the like capable of colder temperatures, this form of food preservation will no doubt rapidly gain popularity.

In my present method I provide means for preserving food products such as fruits, meats, and vegetables with or without sweetening or preservatives.

Briefly, my method consists of quickly freezing the food products at low temperatures, usually —30° F. then placing them in a pressure mold which is maintained at a reasonably low temperature. In this press the products are compressed and deaerated. After deaeration and pressing have been accomplished, the resultant food blocks are glazed with or without water or oil and then finally packaged and maintained at a temperature below freezing.

Many objects are accomplished by my method; the most important are stated briefly and will be amplified further in this specification.

An important object of my invention is the prevention of oxidation. This preserves the flavor and color in my products and preserves the nutritive value of the foods by preserving the vitamin C content and the natural juices of the product.

Another object is the compression of meats, vegetables, and fruits which reduction in volume effects a very substantial saving in cold storage and transportation space.

Another important object of my invention is the preserving without sugar of fruits, particularly, thus rendering the fruit available for many uses, some of which are destroyed with the usual sugar or syrup pack.

Still another object of my invention is the inhibition of bacterial growth.

Other and more specific objects will be apparent from the following description taken in connection with the accompanying drawings, wherein Figure 1 is an elevation showing diagrammatically the essential mechanical elements employed in my method of fruit preservation.

Figure 2 is the type of final food block, or package, created by my method.

Figure 3 is a perspective view showing the feed hopper and press cylinder of my device.

Figure 4 is a plan view of the handling mechanism taken as viewed along the line 4—4 of Figure 1.

Figures 5 to 10, inclusive, show successive steps in the operation of my food press and deaerating means.

Referring to the drawings, throughout which like reference characters indicate like parts, 12 designates the conveyor used in carrying the food products from the initial freezing chamber to my press; this initial quick-freeze may be of any approved type usually using a low temperature of about 30° F. and is provided with a belt conveyor for moving the product through the chamber. As the products pass through the quick-freezing chamber they are deposited on belt 12 which carries them either into the press hopper 14 or, in the case of certain vegetables and some meats, into hopper 15 of grinder 16, where they are comminuted into small bits and then passed into press 18. At this stage a freezing temperature of —5° F. has been found to be very satisfactory. Press 18 is provided with cooling coils as 20 so that the chamber into which the products are deposited has a temperature of approximately —30° F. The construction of press 18 will probably be best understood from a study of Figures 5 to 10, inclusive. It consists of the cylinder proper 22 in which is disposed a reciprocable piston 24. This piston is formed with a guide and sealing member 26 and the spacing member 28. At the lower portion of piston 24 a valve seat is provided at 30. Adapted to engage seat 30 is a valve 32. This valve is provided with a hollow stem 33 which extends up through the length of piston 24 connecting member 28 and the upper piston 26 and is itself provided with a piston and guide 34. Disposed between pistons 26 and 34 is a compression spring 35 so placed as to normally hold valve 32 off seat 30. A packing gland of suitable character is provided at 36 and the extension of stem 33 passing through this gland is provided near its upper end with a second piston 38 shown in Figure I; a further extension of stem 33 is coupled to a flexible tube 40. This tube in turn is connected to a vacuum pump 42 and is controlled by means of valve 43.

From a suitable pressure pump 44 fluid under pressure is conducted to the space between packing ring 36 and piston 38 by tube 46 which lifts the piston mechanism to the top of its stroke. The press chamber 18 is then filled with the desired amount of frozen product and valve 47 is opened to relieve the pressure under piston 38. Fluid under pressure is then conducted by tube 48 to a point below packing 36 and above piston 34 so as to act thereupon and be capable of forcing the entire piston assembly 24, 26, 34, and 38 downwardly. As soon as piston 24 meets resistance, of course, the upper piston 34, and its associated parts, as it continues downwardly compresses spring 35 and seats valve 32 on seat 30.

Disposed below and coaxially with cylinder 22 is a second cylinder 50. In this cylinder is operatively disposed piston 52 which is connected, as by rod 53, with a platform 55. This platform is of such a size as to pass into the lower portion of cylinder 22 after the showing, for instance, of Figures 6, 7, 8, and 9. Pressure for pistons 52 is provided through tube 57 which is controlled as by valve 58 and is supplied by fluid, under pressure, from pump 44.

Disposed in such a manner as to remove the compressed packages of food from table 55 is the conveyor arrangement shown in Figure 4. This consists essentially of a movable belt 60 which is contained within a freezing chamber 62 which is maintained at approximately −30° F. Although the chamber temperature is −30° F. the products will not be in it sufficient time to reach this temperature but will be somewhere between −5° F. and −30° F. Normally this arrangement is provided in a refrigerant tunnel and is, further, usually provided with an air circulating fan as 64. As the compressed, deaerated material is carried along through the tunnel it is finally disposed on a conveyor 66. This conveyor still being maintained at −30° F. is arranged so that a spray of oil or water may be passed over the product so as to glaze it; suitable mechanism can here be employed to spray the complete surface of the product. After the glazing is completed the product is packaged and is maintained at approximately zero degrees Fahrenheit.

*Method of operation*

In using my method the food products are cleaned or otherwise prepared in the orthodox manner. They are then quick-frozen by passing through a refrigerating tunnel, not shown, at −30° F., and delivered on belt 12. The materials are then either passed directly into the press or into grinder 16. This grinding of the frozen meats and vegetables, particularly, and the subsequent pressing of these products, into blocks of small volume is of great value in the preparation of soup stocks, and vegetable mixes, particularly where decreased volume is desirable as from the transportation or storage standpoint. Certain products such as strawberries and other soft fruits and vegetables are entered directly into cylinder 22. Here the first operation is to raise platform 55 until it closes the lower end of cylinder 22 by means of the operation of valve 58. A suitable quantity of the product is then deposited in cylinder 22 and valve 47 is opened to release the trapped fluid under piston 38. Then by means of the valve 48-a in line 48 fluid pressure is introduced into cylinder 22 below packing 36 so as to force downwardly cylinder 34 which in turn carries with it cylinder assembly 26—24. As soon as resistance is reached spring 35 is compressed, valve 32 closes and initial compression taken. This initial pressure probably does nothing more than to fill the little interstices between the fruit or vegetables and squeeze the air out of the same.

The next operation is to release momentarily the pressure on the piston 34; then valve 32 can open and the air thus pressed out of the product will be drawn out through opening 70 and out through tube 72 in stem 33 and finally out through tube 40. This operation may need to be repeated many times; the alternate compression, the driving out of the air, and then the exhausting of the air by the vacuum pump 42. When the final compression has taken place and the air is all driven from the fruit including the fruit cells, the food block is in its final form as shown in Figure 9. The final pressures in cylinder 24 may go up to as high as 50,000 pounds a square inch. Piston 52 is then lowered, carrying with it platform 55, and the piston assembly 24—26—34 and 38 follows downwardly expelling the food block 74 where it is picked up by one of the arms 76 of conveyor 60 and carried out through the refrigerating tunnel and onto belt 66 where it is given its glazing and the processing is completed.

In this process I obtain the deaeration of fruit, meat, and vegetable tissue to an extent that is necessary for retention of natural flavor and color. It is a well known fact that fruit, meat and vegetable tissues contain considerable gases— some tissues such as strawberries are air by volume in the fresh state to the extent of 40%. Many other fruits likewise contain considerable air by volume.

In as much as scientists have found that air outside of the tissue caused oxidation of coloring in fruits, meats, and vegetables, I was convinced by experimentation that the gas contained in the fruit tissue, meat tissue and vegetable tissue was responsible for loss of flavor, and color in fruit and meat tissues and no doubt played a great part in the conversion of chlorophyl to by products. This is especially true when the freezing temperatures were high, around 15 degrees F.

No doubt the conversion of certain pigments such as those existing in strawberries are affected by a high concentration of sugar. This effect being more pronounced in sugar-packed berries than in syrup pack. I find there is a tendency toward a yellow glow rather than the deep red natural color as found in my product. Gases present in the fruit tissues no doubt play a great part in aiding these changes. Carbon dioxide probably is the gas responsible in vegetable tissue. It plays a great part in fruit and meat tissues likewise.

I find the removal of these gases to a degree accomplishes the desired result in that color and flavor are preserved as present in the natural fruit or meat or vegetables.

The use of these fruit flavors in ice-cream has proved its excellent retention of the natural fruit flavor and its ability to impart the flavor to other foods.

The part played by the distinction of catalase through deaeration is evident. The catalase-peroxidase set-up was destroyed. Peroxidase, however, continued to act, but since the catalase was destroyed, its functioning was lowered considerably.

Thus destruction of catalase probably reduced the activity of the oxidizing enzymes, halting many processes that normally take place gradually at lower temperatures. The slowing up of these processes in the cold, and the destruction of catalase lead to the preservation of those qualities that were formally attacked by this process, those being the slow destruction of vitamin C, oxidizing of flavor, and indirect oxidation of coloring.

The inhibition of fermentation and the complete destruction of yeast cells by rupturing is possible by this process. My proof is that by extracting 15 grams of fruit tissues from various samples and allowing those to incubate for 15 to 20 days in wort at room temperatures no fermentation was recorded. I repeated these experiments 15 or 20 times on each type of fruit and obtained the same results.

The destruction of catalase in fruit tissue allowed $H_2O_2$ and organic peroxides to exist in the products unchanged. These peroxides probably are increased considerably by the addition of more peroxides resulting from the effects of peroxidase on the purine bases. The possible death of all yeast cells, especially in fruit tissues, may be traceable to this factor.

The destruction of pectinase in my product I determined by the speed of jelling and the amount of sugar I had to use to accomplish jelling. My product jelled faster and had a better color than samples prepared from sugared berries retained in a sealed container.

Vitamin C, which ordinarily is destroyed by increased temperature, is preserved in frozen fruits which are packaged satisfactorily but in the course of time, in order to preserve vitamin C it becomes necessary to increase the acid content of a given volume of material and to remove any degree of oxidation which is accelerated by the presence of air in the tissue. My process removes the greater part of that free gas and concentrates the acids in a given volume of material. These two factors alone permit the preservation of vitamin C in my product over a long period of time if in a suitable container and retains vitamin C for a year or so in no container at all using only an ice glaze.

The value of this method to the packer of frozen foods is evident when one considers the decrease in volume of the products stored. This is especially true of deaerated frozen fruits. When the space existing between the fruits is removed and the tissues are considerably deaerated the product occupies considerably less volume. That decrease in volume is approximately one-half at 20,000 pounds of pressure. This brings the product down to near the volume of the juice extracted from the fresh fruit. Which points out the possibilities of storing the fruit, juice, and all, in cartons as compared with storing the juice extracted from fresh fruit in glass or tins. The volume difference is very little but the advantage of having the use of the fruit for more than one purpose is apparent.

The volume saving in deaerated frozen meats is not nearly so great, the advantage here being in the retention of flavor, color, by the deaeration method of removing of air from the tissues.

The grinding of frozen vegetables and the subsequent pressing of these products into blocks of small volume would be of great advantage from a military standpoint for soup stocks, vegetable mixes, and even in the incorporation of blanched meats into the soup stocks to produce vegetable meat soups of high quality and flavor.

The advantage to the packer in putting up fruits of excellent flavor without the use of sugar is two-fold. First, it cuts down the cost of labor in adding the sugar, and secondly it saves the cost of transporting the sugar from one section of the country to a destination where sugar can be purchased cheaply and applied to this product with excellent results.

The advantage again to the packer is that he can store twice to three times as much deaerated fruits in the space he formerly used when he put up his product in barrels with sugar or syrup, without increased refrigeration. Again, the packer would gain when considering packaging. Here he saves one-half in cartons, because of a fifty percent decrease in surface area.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

Having thus fully described my invention, what I claim as new and desire to secure by Letters Patent is:

1. A process of preserving food which comprises subjecting the food to a sub-freezing temperature, comminuting the frozen food, pressing the frozen, comminuted food under a relatively light pressure to remove air from the interstices of the food mass, releasing the pressure, and then subjecting the deaerated mass to a relatively heavy pressure to break the food cells and exhaust the gaseous matter therefrom.

2. A process of preserving food which comprises subjecting the food to a sub-freezing temperature, comminuting the frozen food, pressing the frozen, comminuted food under a relatively light super-atmospheric pressure, releasing the pressure, and then subjecting the deaerated mass to a relatively heavy super-atmospheric pressure to break the food cells and exhaust the gaseous matter therefrom while the food mass is subjected to a sub-zero temperature.

3. A process of preserving food which comprises subjecting the food to a sub-freezing temperature, comminuting the frozen food, pressing the frozen comminuted food under a relatively light super-atmospheric pressure to exhaust the air from the interstices of the mass, repeatedly subjecting the deaerated mass to alternate atmospheric and relatively high super-atmospheric pressure to exhaust the gaseous matter from the food cellular structure.

4. A process of preserving food which comprises subjecting the food to a sub-freezing temperature, comminuting the frozen food, pressing the frozen food under a relatively light super-atmospheric pressure to exhaust the air from the interstices of the mass, repeatedly subjecting the deaerated mass to alternate atmospheric and relatively high super-atmospheric pressure to exhaust the gaseous matter from the food cells while the mass is continually subjected to a sub-zero temperature.

EUGENE G. HAWKINS.